United States Patent
Stegemann et al.

(10) Patent No.: US 9,573,107 B2
(45) Date of Patent: Feb. 21, 2017

(54) PROCESS FOR OPERATING A FUEL FIRED REACTOR

(75) Inventors: Bertold Stegemann, Eschborn (DE); Pekka Hiltunen, Kemmern (DE)

(73) Assignee: OUTOTEC (FINLAND) OY, Espoo (FI)

( * ) Notice: Subject to any disclaimer, the term of this patent is extended or adjusted under 35 U.S.C. 154(b) by 183 days.

(21) Appl. No.: 14/374,534

(22) PCT Filed: Jan. 27, 2012

(86) PCT No.: PCT/EP2012/051333
§ 371 (c)(1),
(2), (4) Date: Feb. 23, 2015

(87) PCT Pub. No.: WO2013/110344
PCT Pub. Date: Aug. 1, 2013

(65) Prior Publication Data
US 2015/0202584 A1    Jul. 23, 2015

(51) Int. Cl.
*B01J 6/00*        (2006.01)
*B01J 8/18*        (2006.01)
*B01J 8/08*        (2006.01)
*B01J 19/00*       (2006.01)
*B01J 8/00*        (2006.01)
(Continued)

(52) U.S. Cl.
CPC ............... *B01J 8/1809* (2013.01); *B01J 6/001* (2013.01); *B01J 8/001* (2013.01); *B01J 8/082* (2013.01); *B01J 8/24* (2013.01); *B01J 19/002* (2013.01); *B01J 19/0006* (2013.01); *C01F 7/021* (2013.01); *B01J 2208/00017* (2013.01); *B01J 2208/00044* (2013.01); *B01J 2208/00504* (2013.01); *B01J 2208/00628* (2013.01); *B01J 2208/00716* (2013.01); *B01J 2219/00051* (2013.01); *B01J 2219/00157* (2013.01); *B01J 2219/00186* (2013.01); *B01J 2219/00259* (2013.01)

(58) Field of Classification Search
USPC .............................................. 431/15, 27, 69
See application file for complete search history.

(56) References Cited

U.S. PATENT DOCUMENTS 2,687,169 A * 8/1954 Maurice .................... F23N 5/10
                                                    137/66
4,451,226 A * 5/1984 Landis ..................... F23N 3/082
                                                    340/577
(Continued)

FOREIGN PATENT DOCUMENTS

CN          202049364 U    11/2011
GB          2403530 A      1/2005

*Primary Examiner* — Avinash Savani
(74) *Attorney, Agent, or Firm* — Leydig, Voit & Mayer, Ltd.

(57) ABSTRACT

A process for operating a fuel fired reactor includes introducing fuel into the reactor and burning the fuel in the reactor by means of at least one main burner. Relevant parameters of the process are monitored. Within a predetermined critical operating range for an enforced shut down, a secondary, more stringent operating range is implemented as shut down criteria. The main burner is shut down upon one or more of the relevant parameters leaving the secondary operating range while at least one pilot burner continues to operate as long as the relevant parameters are maintained within the critical operating range.

13 Claims, 1 Drawing Sheet

(51) Int. Cl.
*B01J 8/24* (2006.01)
*C01F 7/02* (2006.01)

(56) References Cited

U.S. PATENT DOCUMENTS

| | | | | |
|---|---|---|---|---|
| 4,923,117 A | * | 5/1990 | Adams | F23N 1/002 236/94 |
| 5,211,063 A | * | 5/1993 | Hobmaier | G08C 19/38 324/207.14 |
| 5,365,223 A | * | 11/1994 | Sigafus | F23N 5/12 340/578 |
| 5,406,969 A | * | 4/1995 | Gray | B22D 41/14 137/13 |
| 2003/0167690 A1 | | 9/2003 | Edlund et al. | |
| 2006/0088455 A1 | | 4/2006 | Jones | |

* cited by examiner

PROCESS FOR OPERATING A FUEL FIRED REACTOR

CROSS-REFERENCE TO PRIOR APPLICATIONS

This application is a U.S. National Stage Application under 35 U.S.C. §371 of International Application No. PCT/EP2012/051333 filed on Jan. 27, 2012. The International Application was published in English on Aug. 1, 2013, as WO 2013/110344 A1 under PCT Article 21.

FIELD

The present invention is directed to a process for operating a fuel fired reactor, wherein fuel is introduced into a reactor and burned therein by means of at least one main burner, wherein the relevant parameters of the process are monitored and wherein the main burner is shut down if one or more of the relevant parameters leaves a predetermined critical operating range.

BACKGROUND

In a multitude of the thermal processes the process equipment is heated up by a preheat burner installation before the start of the main burner system needed for the continuous and designated plant operation. When the main burner system is operated, the preheat burner is shut down. All modes of burner operation are regulated by national or international regulations such as the EN-746-2 or equivalent. To avoid hazardous operation resulting from incomplete combustion, the violation of the parameters stipulated in such regulations, which define a permissible or hereinafter called critical operating range, results in mandatory shut downs of the burner system. The currently used modes of operation and processes result in an enforced shut down of the burner system and subsequently the entire process if the safety relevant parameters, in particular temperature, air/fuel ratio, $O_2$-concentration etc. in the reactor, are violated. In addition, the reactor often has to be purged resulting in a significant loss of temperature, time, heating fuel and production since reheating for a restart of the reactor is required.

SUMMARY

In an embodiment the present invention provides a process for operating a fuel fired reactor. Fuel is introduced into the reactor and burned therein by means of at least one main burner. Relevant parameters of the process are monitored. Within a predetermined critical operating range for an enforced shut down, a secondary, more stringent operating range is implemented as shut down criteria. The main burner is shut down upon one or more of the relevant parameters leaving the secondary operating range while at least one pilot burner continues to operate as long as the relevant parameters are maintained within the critical operating range.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
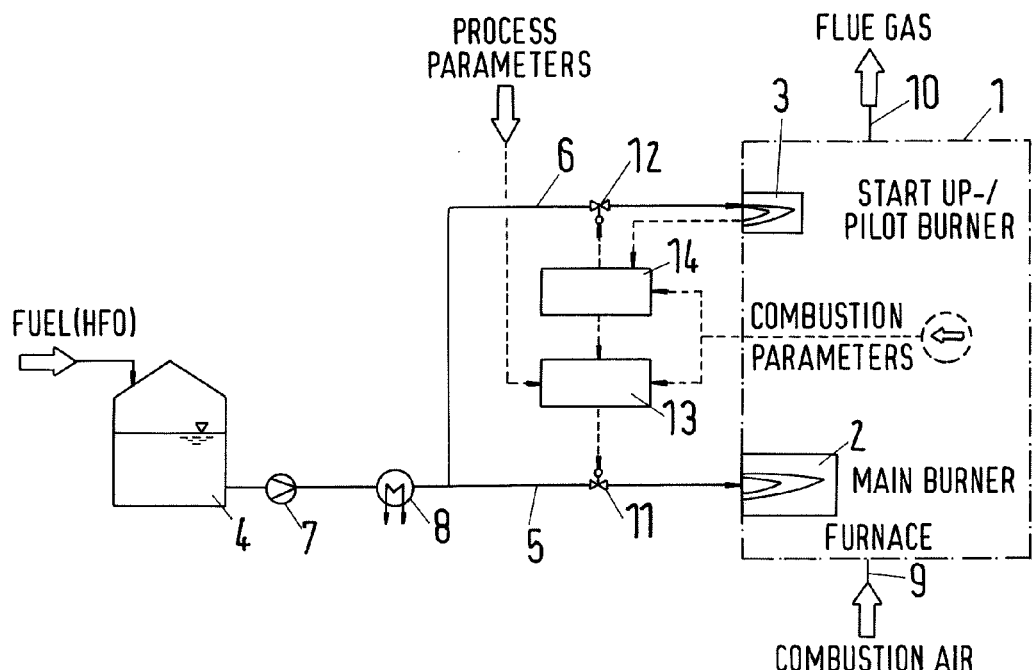
FIG. 1 is a simplified process flow diagram of a plant implementing the process of an embodiment of the present invention.

In an embodiment, the present invention avoids unnecessary shut downs of the reactor in order to reduce the loss of energy and production.

In particular, it is provided that, in a process according to an embodiment of the present invention, within the predetermined critical operating range for the enforced shut down of the reactor, a secondary, more stringent operating range for the shut down criteria is implemented, wherein the main burner is shut down if one or more of the relevant parameters leaves the secondary operating range, while at least one pilot burner continues to be operated as long as the relevant parameters are maintained within the critical operating range. The pilot burner(s) itself preferably is/are monitored by a burner management system separate from the main burner system, complying with the relevant legal requirements, such as EN-746-2.

Practice has shown that most of the fuel fired reactors usually are operated within a rather small range of the operating parameters. Upon external influences, such as fluctuations in the fuel composition, the reactor pressure, etc., one or more of the relevant parameters leaves not only the normal operating range but also the critical operating range leading to an enforced shut down of the complete reactor. In most cases the operating parameters could be very quickly returned to the permissible operating range by, e.g., adapting the fuel or $O_2$ supply, but due to the official regulations, the shutdown of the plant is necessary as soon as the critical operating range is violated.

By providing the secondary, more stringent operating range the main burner is shut down well before the critical operating range is reached so that in most cases the reactor can be stabilized and returned to normal operating conditions by adapting the input variables. In this time period the pilot burner still is operated to maintain the temperature within the reactor. Accordingly, it is not necessary to reheat the reactor after the normal operating range is reaccomplished. Further, a purge of the reactor is not necessary as long as the critical operating range is not violated.

In a preferred embodiment of the invention the main burner is restarted as soon as all relevant parameters have returned to be within the secondary operating range, so that normal operation of the reactor can be quickly resumed.

Preferably and depending on the respective parameter, the upper limit of the secondary operating range is about 5 to 50%, preferably about 7.5 to 30% and more preferably 10 to 20% lower than the upper limit of the critical operating range, and the lower limit of the secondary operating range is about 5 to 50%, preferably about 7.5 to 30% and more preferably 10 to 20% higher than the lower limit of the critical operating range. Normal operation, therefore, is performed in a smaller operating range preferably corresponding to 60 to 80% of the critical operating range defined by the relevant national or international regulation. In most cases this will ensure a continuous operation of the reactor while the secondary operating range provides for an easy possibility to readjust the operating conditions within the reactor without requiring a complete shutdown.

Usually, the relevant parameters of the process are the temperature, the air/fuel ratio and/or the $O_2$-concentration within the reactor. Depending on the process and the relevant official regulations, however, other parameters may be considered.

It is present standard procedure that, except for a brief period of time during the switch over from preheating to normal operation, the preheat burners and main burners are not operated in parallel. Rather, in the prior art, the preheat burners are shut down once the main burners begin their operation. Contrary to that, an embodiment of the present invention provides for a parallel operation of the pilot burner and the main burner as long as the process parameters are maintained within the secondary operating range. Thereby, a smooth transition is secured when the main burners are shut down upon leaving the secondary operating range. The pilot burner can easily maintain the temperature in the reactor in order to allow for a smooth restart without requiring to purge the reactor.

In the prior art, the preheat burner are usually operated with Diesel fuel, while the main burners are operated with heavy fuel oil or natural gas. This requires two separate fuel supply infrastructures and thus increases equipment and maintenance costs. By operating the main burner and the pilot burner with the same fuel as the main burner, in particular with heavy fuel oil or natural gas, the infrastructure can be facilitated and costs can be reduced.

In the plant shown in FIG. 1, a reactor 1, in particular a furnace, comprises a main burner system 2 and a start up or pilot burner system 3. The main burner system 2 and/or the pilot burner system 3 each may consist of one or more, in particular four burners. The main burner 2 and the pilot burner 3 are supplied with a fossil fuel, in particular heavy fuel oil, stored in a fuel tank 4 through main supply line 5 and pilot supply line 6, respectively. A fuel pump 7 provides for the required fuel pressure, while the required fuel temperature is regulated by a fuel preheater 8. Instead of heavy fuel oil natural gas or any other suitable fossil or synthetic fuel may be used.

Combustion air is introduced into the reactor 1 through line 9 as primary air. Additionally, secondary air may be introduced if required. The flue gas is withdrawn from the reactor 1 through line 10.

In the main supply line 5 and the pilot supply line 6 shut off valves 11, 12 are provided which are operated by a safety and interlock system 13 and a pilot burner safety system 14, respectively.

Upon operation the relevant parameters in the reactor 1 and/or the off-gas line 10, such as the temperature within the reactor, the air/fuel ratio and/or the oxygen concentration within the reactor, etc, are detected by respective detectors and fed into a control system, in particular the safety and interlock system 13 and the pilot burner safety system 14, where they are compared with predetermined process parameters defined by the operating personnel and/or official regulations.

If the comparison between the actual operating parameters in the reactor 1 and the predetermined process parameters reveals that one or more of the parameters exceeds an upper or lower limit of a secondary operating range defined for the process, the safety and interlock system 13 will close the shut off valve 11 so that the main burner 2 is shut off. The pilot burner 3, however, still is supplied with fuel through the pilot supply line 6 so that it continues to operate and maintains the temperature within the reactor 1. If during further operation of the reactor 1 the actual operating parameters measured within the reactor 1 return to the permissible operating range within the secondary operating range, the shut off valve 11 is opened again and the main burner 2 is reignited so that the reactor 1 returns to normal operation.

If, however, the comparison between the actual process parameters in the reactor 1 and the predetermined process parameters reveals that the actual process parameters exceed critical limits defining a critical operating range, the reactor 1 has to be shut down completely in order to comply with official regulations. In this case, not only the shut off valve 11 leading to main burner 2 but also the shut off valve 12 leading to pilot burner 3 are closed so that all burners 2, 3 and thereby the complete reactor 1 are shut down. In this case, the reactor 1 has to be purged, which normally is carried out through the primary air line 9 and/or a secondary air line. Thereafter, preheating of the reactor 1 via the pilot burner 3 may be resumed, and when a predetermined temperature of the reactor 1 is reached also the main burners 2 are put back into operation.

Figure 2:
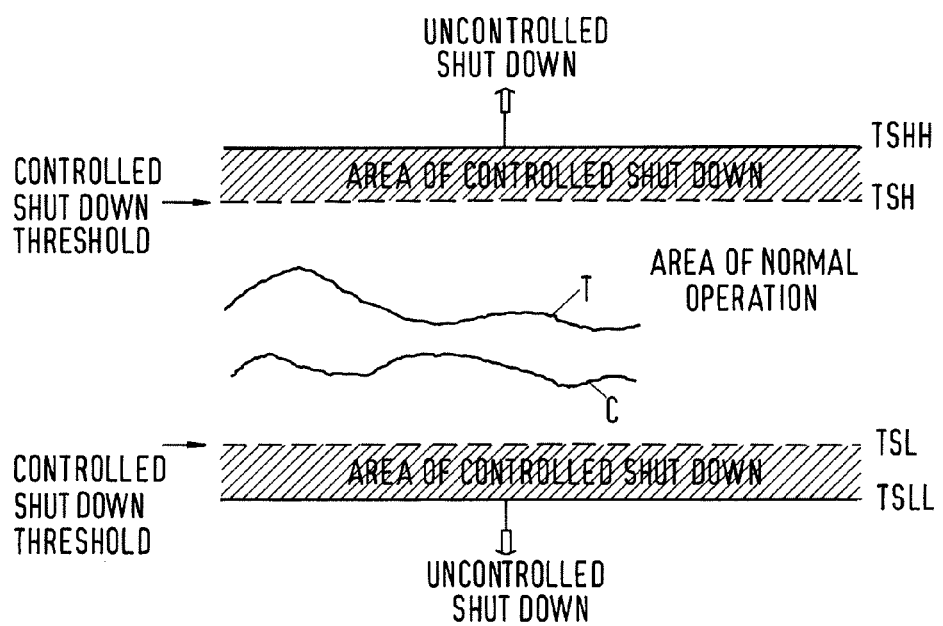
FIG. 2 is a diagram schematically showing the operating ranges used in the process of an embodiment of the present invention.

In FIG. 2 the measured process parameters during normal operation are shown. The curve T indicates the temperature within the reactor, while the curve C indicates the $O_2$-concentration within the reactor. These parameters are only examples of possible relevant process parameters necessary to monitor a controlled process in the reactor 1.

As evident from FIG. 2 both curves T and C are well within the area of normal operation. The area of normal operation is limited by an upper and lower level TSH and TSL defining thresholds for a controlled shutdown of the reactor if this threshold is crossed by the curve T or C. In case of such a controlled shutdown the main burner 2 is shut down as described above while the pilot burner 3 continues to be operated. Thereby, the temperature within the reactor 1 is maintained at a desired level.

In case the temperature or $O_2$-concentration leaves a critical operating range as defined by upper and lower levels TSHH and TSLL, a complete and uncontrolled shutdown of the reactor 1 has to be performed in order to comply with official regulations. In this case also the pilot burner 3 is shut down as described above.

In most cases, however, it will suffice to shut down the main burner 2 if the controlled shut down threshold is exceeded, so that the reactor 1 can return to normal operating conditions. Then, the main burner 2 is reignited.

The process according to the invention allows for a quick restart minimizing downtimes of the reactor and boosting availability. Thereby, energy losses can be minimized and production figures can be increased. As the main burner 2 and the pilot burner 3 are operated by the same fuel, it is possible to reduce the investment costs. As the process according to the invention can be included in the operation of existing plants, such plants can be revamped so that the operating efficiency can be improved.

Example

Alumina Calcination

Alumina calcination often is effected in a circulating fluidized bed reactor. The preferred operating temperature T of such a reactor is about 950° C. If heavy fuel oil is used as fuel, the admissible minimal combustion temperature is 750° C. If the temperature in the reactor falls below this limit, the reactor has to be shut down. Due to material constraints the maximum operating temperature of the calcining reactor is 1.100° C. Usually, the burner system is shut off, if the content of free oxygen ($O_2$) falls below about 1 vol.-%. There is no upper limit for the oxygen concentration as it is not relevant for plant safety.

Based on the critical operating range of the temperature 750° C.<T<1.100° C. the respective lower limit of the secondary operating range would be set at e.g. 800° C. or 825° C., while the upper limit of the secondary operating range would be set at e.g. 1.050° C. If the upper limit is not relevant for the plant safety (no mandatory shut-down of the plant in case of violation of this limit), no upper limit needs to be defined for the secondary operating range.

The lower limit of the secondary operating range of the oxygen concentration C could be set at e.g. 1.5 vol.-%. There is no critical upper limit of the oxygen concentration as it is not relevant for plant safety. Consequently, no upper limit of the respective secondary operating range is defined.

This results in the following operating ranges:
T: critical operating range: 750° C.<T<1.100° C.
secondary operating range: 800° C.<T (<1.050° C.)
C: critical operating range: C>1 vol.-%
secondary operating range: C>1.5 vol.-%

The above values are intended to exemplify the present invention based on a preferred embodiment only but do not limit the scope of protection of the appended claims. The adequate relation between the limits of the critical and secondary operating ranges will have to be adapted to the respective parameter, process and plant.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS 1 reactor
2 main burner
3 pilot burner
4 fuel tank
5 main supply line
6 pilot supply line
7 fuel pump
8 fuel preheater
9 line
10 line
11 shut off valve of main burner 2
12 shut off valve of pilot burner 3
13 safety and interlock system
14 pilot burner safety system
T temperature
C $O_2$-concentration
TSL lower threshold of secondary operating range
TSH upper threshold of secondary operating range
TSLL lower threshold of critical operating range
TSHH upper threshold of critical operating range

The invention claimed is:

1. A process for operating a fuel fired reactor, the process comprising:
introducing fuel into the reactor;
burning the fuel in the reactor using at least one main burner;
monitoring relevant parameters of the process;
implementing, within a predetermined critical operating range for an enforced shut down, a secondary, more stringent operating range as shut down criteria, wherein an upper limit of the secondary operating range is about 5 to 50% lower than an upper limit of the critical operating range; and
shutting down the main burner upon one or more of the relevant parameters leaving the secondary operating range, while continuing to operate at least one pilot burner as long as the relevant parameters are maintained within the critical operating range.

2. The process according to claim 1, further comprising restarting the main burner upon all relevant parameters returning to be within the secondary operating range.

3. The process according to claim 1, wherein a lower limit of the secondary operating range is about 5 to 50% higher than a lower limit of the critical operating range.

4. The process according to claim 1, wherein the relevant parameters of the process include at least one of a temperature, an air/fuel ratio and an $O_2$ concentration within the reactor.

5. The process according to claim 1, wherein, during normal operation within the secondary operating range, the pilot burner is operated in parallel with the main burner.

6. The process according to claim 1, wherein the main burner and the pilot burner are operated with the same fuel.

7. The process according to claim 6, wherein the main burner and the pilot burner are operated with heavy fuel oil or natural gas.

8. A process for operating a fuel fired reactor, the process comprising:
introducing fuel into the reactor;
burning the fuel in the reactor using at least one main burner;
monitoring relevant parameters of the process;
implementing, within a predetermined critical operating range for an enforced shut down, a secondary, more stringent operating range as shut down criteria, wherein a lower limit of the secondary operating range is about 5 to 50 higher than a lower limit of the critical operating range; and
shutting down the main burner upon one or more of the relevant parameters leaving the secondary operating range, while continuing to operate at least one pilot burner as long as the relevant parameters are maintained within the critical operating range.

9. The process according to claim 8, further comprising restarting the main burner upon all relevant parameters returning to be within the secondary operating range.

10. The process according to claim 8, wherein the relevant parameters of the process include at least one of a temperature, an air/fuel ratio and an $O_2$ concentration within the reactor.

11. The process according to claim 8, wherein, during normal operation within the secondary operating range, the pilot burner is operated in parallel with the main burner.

12. The process according to claim 8, wherein the main burner and the pilot burner are operated with the same fuel.

13. The process according to claim 12, wherein the main burner and the pilot burner are operated with heavy fuel oil or natural gas.

* * * * *